United States Patent Office 3,038,866
Patented June 12, 1962

3,038,866
ANION EXCHANGE RESINS CROSS-LINKED WITH HEXAHYDRO-TRIACRYLYL TRIAZINES
Walter Hagge, Leverkusen, Mathieu Quaedvlieg, Leverkusen-Bayerwerk, and Hans Seifert, Bergisch-Neukirchen, Germany, assignors to Farbenfabriken Bayer Aktiengesellschaft, Leverkusen, Germany, a corporation of Germany
No Drawing. Filed Apr. 21, 1959, Ser. No. 807,750
Claims priority, application Germany Apr. 22, 1958
4 Claims. (Cl. 260—2.1)

The present invention relates to anion exchange resins having anion exchange groups attached to a cross-linked resin matrix consisting of copolymers of monovinylaromatic compounds and hexahydro-1,3,5-triacyl-s-triazines, the acyl groups of which contain an ethylenically unsaturated group.

Anion exchangers having a water insoluble resin-matrix of cross-linked polystyrene are known. The water-insolubility of this resin-matrix is generally achieved by copolymerising a polyvinylidene compound, more especially divinyl benzene, and a monovinylaromatic compound such as styrene, ethylstyrene, methylstyrene or other styrenes having one or two lower alkyl groups in the aromatic nucleus. These cross-linked polystyrenes can be transformed into anion exchangers by chloromethylation and subsequent amination with primary, secondary or preferably tertiary amines as shown for instance in United States Patents 2,591,573; 2,591,574; 2,614,099; 2,616,877; 2,629,710; 2,631,999; 2,632,000; 2,642,417; 2,725,361; 2,794,785.

The cross-linking with divinyl benzene has the disadvantage that the pearl polymers which are obtained must be freed from impurities of low molecular weight by complicated purification methods in order to obtain polymer grains which are sufficiently resistant mechanically to withstand the subsequent chloromethylation and amination treatment. Furthermore, the exchangers obtained in this way also present the disadvantage that their grains are not compact enough to satisfy all demands.

It has now been found that styrene polymers which are cross-linked with from 0.1 to 20 percent, advantageously 2 to 10 percent as calculated on the weight of the total monomers, of hexahydro-1,3,5-triacyl-s-triazines, the acyl radicals of which contain polymerisable carbon to carbon double bonds, are excellently suitable for the production of anion exchangers with a particularly compact grain. For example by using hexahydro-1,3,5-triacrylyl-s-triazine, polymers which are especially suitable for being further processed by chloromethylation and amination to form anion exchangers, are obtained.

The copolymerisation of the aforementioned components is preferably carried through according to the method of bead or suspension polymerisation in which the styrene compounds are suspended in a non-solvent such as water, whereas the copolymerisation component may be at least partially dissolved in the polymerisation medium. The polymerisation is accelerated by means of well-known free radical-forming catalysts such as organic peroxidic agents (benzoylperoxide, acetylperoxide, tert. butylhydroperoxide, water soluble persulfates), catalysts containing an azo-group such as α,α′-azodiisobutyric acid nitrile.

Furthermore, the well-known redox systems may be applied which contain besides a free radical-forming polymerisation catalyst, a reducing agent such as $SO_2$, formamidinesulfinic acid, p-toluene-sulfinic acid, formaldehyde sodium sulfoxylate etc. The catalysts are employed in amounts ranging from about 0.1 to about 3 percent based on the weight of the monomers to be copolymerised. The polymerisation temperature may vary within the range of about 30 to 100° C.

Whereas the pearl polymerisation of styrene with divinyl benzene proceeds spontaneously at temperatures in the region of 80° C. with considerable heat of reaction, this is not the case when hexahydro-1,3,5-triacrylyl-s-triazine is used, as solid pearl-like products can then be obtained at 60° C. without any particular rise in temperature. The course of this reaction offers important technical advantages compared with the prior art. Furthermore, the said cross-linking agent has only limited solubility in the monomers and unlimited solubility in water, this being in contrast to the known cross-linking agents. It was consequently not to be foreseen that copolymers having a particularly high grain compactness would be formed by the pearl polymerisation of the present components.

The introduction of anion-exchanging groups in the above resin matrix may be effected by well-known methods. For instance this resin matrix may be haloalkylated by reacting the matrix with a mixture of an aldehyde, such as formaldehyde and hydrochloric acid or by reacting the resins with chloromethyl methylether or bromomethyl methylether in the present of a catalyst such as zinc chloride.

The amination of the said haloalkylated resins is also carried through according to well-known methods by reacting said products with primary, secondary or preferably tertiary amines such as trimethylamine, triethylamine, dimethylethanolamine ethylenediamine, N,N′-tetramethyl ethylenediamine or derivatives of said amines in which a nitrogen group is quaternised such as by methyl chloride, dimethylsulphate, ethylene oxide. The halo-alkylating and amination methods are for instance disclosed in the aforementioned United States patent specifications.

There are obtained anion exchangers which are characterised by particularly high grain compactness compared with the corresponding exchangers based on copolymerisation of styrene and divinyl benzene. This applies especially as regards exchanger pearls having a relatively large grain diameter.

*Example 1*

25 g. of hexahydro-1,3,5-triacrylyl-s-triazine (triacrylformal) in crystallised form are placed in a 2-litre beaker fitted with a ground glass stopper and equipped with a stirrer mechanism, thermometer and reflux condenser. Then 1000 ccs. of an aqueous solution containing 0.05 percent of methrylcellulose and finally a solution of 6.7 g. of 75 percent benzoyl peroxide in 500 g. of styrene are added. While stirring well, the temperature is raised to 60° C. and kept for 3 hours at this temperature. The polymerisation is completed by keeping the temperature for more than 2 hours at 80° C. followed by an hour at 100° C. to obtain a pearl polymer of which 81 percent is in the size range of from 0.3 to 0.5 mm.

At room temperature the grain size of 0.4 mm. has a maximum swelling under the action of tetrahydrofuran of 180 percent.

After this product has been chloromethylated (for example with chloromethyl ether by known methods) and subsequently quaternised with dimethyl aminoethanol, a yield of 2000 ccs. of a strongly basic anion exchanger having a compact grain is obtained. 100 ccs. of regenerated exchanger of grain size in the region of 0.5 mm. were subjected in continuous flow to the action of N/100 common salt solution. The effective volumetric capacity, measured from the splitting of common salt into free sodium hydroxide solution, is 2.5 g. of CaO. After charging, the volume of the exchanger is 93 cc.

*Example 2*

The reaction mixture consisting of 40 g. of hexahydro-1,3,5-triacrylyl-s-triazine (triacryl formal) and a 100 ccs.

aqueous solution containing 0.5 percent of polyvinyl-alcohol, as well as the solution of 6.7 g. of 75 percent benzoyl peroxide in 500 g. of styrene, is treated under the same conditions as in Example 1 (3 hours at 60° C., 2 hours at 80° C. and 1 hour at 100° C.).

A pearl polymer having the following composition is obtained:

| | Percent |
|---|---|
| 1st fraction, <0.5 mm | 2.33 |
| 2nd fraction, >0.3 mm | 4.00 |
| 3rd fraction, >0.5 mm | 21.00 |
| 4th fraction, >1.0 mm | 10.20 |
| 5th fraction, >1.2 mm | 40.00 |
| 6th fraction, >1.5 mm | 22.20 |

At room temperature the grain size of 0.4 mm. has a maximum swelling under the action of tetrahydrofuran of 118 percent.

From the grain size of between 1 and 1.5 mm., a completely intact exchanger with a strongly basic character and compact grain is obtained after chloromethylation and subsequent quaternisation with dimethyl aminoethanol. The yield from 200 g. of pearl polymer is 775 ccs.

The product exists as opaque and completely intact pearls with a diameter of 2 mm.

*Example 3*

The following reaction mixture consisting of 50 g. of hexahydro-1,3,5-triacrylyl-s-triazine (triacryl formal) dissolved or suspended in 1000 ccs. of an aqueous 0.05 percent gelatine solution and also the solution of 1.7 g. of 75 percent benzoyl peroxide in 500 g. of styrene is treated under the same conditions as in Example 1. A pearl polymer with the following screen analysis is obtained:

| | Percent |
|---|---|
| 1st fraction, <0.3 mm | 2.80 |
| 2nd fraction, 0.3 mm | 12.00 |
| 3rd fraction, 0.4 mm | 36.00 |
| 4th fraction, 0.5 mm | 47.70 |
| 5th fraction, 1.0 mm | 1.60 |

At room temperature the grain size of 0.4 mm. has a maximum swelling under the action of tetrahydrofuran of 100 percent.

An exchanger with a compact grain and capable of splitting neutral salts is obtained from the grain size of 0.3 to 0.5 mm. after chlormethylation and quaternisation with dimethyl amino ethanol. 680 ccs. of exchanger are formed from 200 g. of pearl polymer.

*Example 4*

A pearl polymer according to Example 3 with the grain size of 0.3 to 0.5 mm. is chloromethylated and quaternised with an aqueous trimethylamine solution. A strongly basic anion exchanger with compact grain is obtained. 1700 ccs. of exchanger are formed from 400 g. of pearl polymer. In determining the capacity from the splitting of common salt 1.5 g. of CaO are produced for every 100 ccs. of exchanger.

*Example 5*

37.5 g. of hexahydro-1,3,5-triacrylyl-s-triazine (triacryl formal) are placed in a beaker fitted with a ground glass stopper and with a stirrer mechanism, thermometer and reflux condenser, 1500 cc. of an aqueous solution containing 0.10 percent of methyl cellulose, and finally a solution of 2.5 g. of 75 percent benzoyl peroxide in 705 g. of styrene are introduced. While stirring well, the beaker is heated to 60° C. kept at this temperature for 3 hours, and the reactants are finally polymerised over a period of 2 hours at 80° C. and one hour at 100° C. The resulting pearl product is chloromethylated by one of the known methods. The chloromethylated product is reacted with excess ethylene diamine at 60° C. for about 16 hours. From 50 parts by weight of pearl polymer with the grain fraction of from 0.3 to 0.5 mm., there are obtained 125 parts by volume of a weakly basic exchanger with an effective volumetric capacity of 4.2 g. of CaO for 100 ccs. of exchanger. After charging, 100 ccs. of exchanger swell to a volume of 108 ccs. The capacity is determined with N/100 HCl.

The bead polymers disclosed in the examples may be chloromethylated by one of the following methods:

(1) 400 g. of copolymer are swelled for 30 minutes in 1600 g. of ethylene chloride. To the mixture there are added 240 g. of p-formaldehyde and 320 g. of methanol. Thereafter there are added at 30° C. within 4 hours 640 g. of anhydrous aluminum chloride. After stirring said mixture at 30° C. for 16 hours, 750 cc. of water are added within 1 hour while keeping the reaction mixture at a temperature not surpassing 40° C. Thereafter the chloromethylated copolymer is sucked off from the reaction mixture and washed with water.

(2) 500 g. of the copolymer are swelled for 15 minutes in 1000 ccs. of mono-chloromethyl methyl ether whereafter 500 ccs. of trichloroethylene or ethylene chloride are added. To the mixture there are added 230 g. of zinc chloride and the mixture is stirred for 20 hours at 50° C. Thereafter 500 ccs. of water are added while the reaction mixture is kept for 1 hour at room temperature. Thereafter the chloromethylated copolymer is sucked off for the reaction mixture and washed with water. The chlorine content of the chloromethylated copolymers thus obtained amounts to 18 to 20 percent by weight.

For aminating the above disclosed chloromethylated copolymers, the said copolymers are reacted with a molar excess of a suitable amine at temperatures of about 60° C. for about 10 to 20 hours. The amines are usually applied in amounts of 1.5 to 3 mols of amines as calculated on the chloromethyl groups, present in the copolymer. Thereafter the aminated resin is separated from the reaction mixture by filtering and washed with water.

The aminated resins thus produced contain per aromatic nucleus an average from 0.5 to 1.2 aminomethyl groups.

What is claimed is:

1. A water-insoluble anion-exchange resin having a cross-linked resin matrix comprising aromatic nuclei, and having aminoalkyl groups bonded to said aromatic nuclei, said cross-linked resin matrix being a bead copolymer of 0.1 to 20 percent of hexahydro-1,3,5-triacrylyl-s-triazine and 99.9 to 80 percent of a monovinyl aromatic compound.

2. In the process of producing water-insoluble anion exchange resins by copolymerizing a monovinyl benzene compound and a cross-linking agent which is copolymerizable with said monovinyl compound in an aqueous medium at temperatures between about 30 to 100° C. to produce cross-linked copolymers comprising aromatic nuclei, halo-alkylating said cross-linked copolymer in the presence of a Friedel-Crafts catalyst and aminating the halo-alkylated cross-linked resin, the use, as a cross-linking agent in the production of said copolymer, of 0.5–20% by weight of hexahydro-1,3,5-triacrylyl-s-triazine, said percentage being based on the total weight of monomer employed for the production of the copolymers.

3. A process according to claim 2 wherein said cross-linking agent is employed in amounts of 2–10% by weight.

4. A water insoluble anion resin obtained by copolymerising a monovinyl benzene compound and 0.5–20 percent by weight of hexahydro-1,3,5-triacrylyl-s-triazine, said percentage being based on the total weight of the monomer employed for copolymerization, in an aqueous medium at temperatures between about 30–100° C. to produce cross-linked copolymers having aromatic nuclei, haloalkylating said cross-linked copolymer in the presence of a Friedel-Crafts catalyst and aminating the haloalkylated cross-linked resin.

References Cited in the file of this patent
UNITED STATES PATENTS 2,615,882    Zerner _____ Oct. 28, 1952
2,824,844    Gilwood _____ Feb. 25, 1958